United States Patent [19]

Kamio

[11] Patent Number: 5,469,760
[45] Date of Patent: Nov. 28, 1995

[54] CLUTCH WEAR-COMPENSATING COMPOUND FLYWHEEL ASSEMBLY

[75] Inventor: Takenori Kamio, Neyagawa, Japan

[73] Assignee: Kabushi Kaisha Daikin Seisakusho, Osaka, Japan

[21] Appl. No.: 257,879

[22] Filed: Jun. 10, 1994

Related U.S. Application Data

[62] Division of Ser. No. 96,046, Jul. 22, 1993, Pat. No. 5,349,882.

[30] Foreign Application Priority Data

Jul. 23, 1992 [JP] Japan .................. 4-196649

[51] Int. Cl.⁶ .................. G05G 1/00; F16D 13/54
[52] U.S. Cl. .................. 74/572; 192/70.25; 192/111 A; 192/111 B
[58] Field of Search .................. 74/572–574; 192/111 A, 192/111 B, 111 R, 111 T, 70.25, 70.26

[56] References Cited

U.S. PATENT DOCUMENTS

| | | | |
|---|---|---|---|
| 4,285,424 | 8/1981 | Sink et al. | 192/111 B |
| 4,720,002 | 1/1988 | Kitano | 192/111 B |
| 4,832,164 | 5/1989 | Flotow | 192/111 B |
| 5,069,322 | 12/1991 | Mizukami et al. | 192/111 A X |
| 5,170,873 | 12/1992 | Fukuda | 192/70.25 |
| 5,230,413 | 7/1993 | Lewis et al. | 192/111 B X |
| 5,238,093 | 8/1993 | Campbell | 192/30 W |
| 5,325,349 | 7/1994 | Dommett et al. | 192/70.25 |

FOREIGN PATENT DOCUMENTS

| | | | |
|---|---|---|---|
| 0568990 | 11/1993 | European Pat. Off. | 192/111 A |
| 2606477 | 5/1988 | France | 192/111 A |
| 3420537 | 12/1985 | Germany | 192/111 A |
| 63-270925 | 11/1988 | Japan | 192/11 A |
| 2176256 | 12/1986 | United Kingdom | 192/111 A |
| 2264989 | 9/1993 | United Kingdom | 192/111 A |
| 88/03613 | 5/1988 | WIPO | 192/111 A |

*Primary Examiner*—Vinh T. Luong
*Attorney, Agent, or Firm*—Knobbe, Martens, Olson & Bear

[57] ABSTRACT

A compound flywheel assembly for compensating a wear on a clutch disc includes a first flywheel peripherally carrying a ring gear via which the assembly is cranked in starting the engine, afforded a certain amount of angular backlash; a second flywheel bearing the friction facing, connected to the first flywheel so as to be angularly fixed yet axially movable; a clutch wear-gauging mechanism provided peripherally in an end surface of the first flywheel opposite the peripheral margin of the pressure plate sandwiching the clutch disc; and an adjusting mechanism. The wear on the clutch disc is gauged by the clutch wear-gauging mechanism in contacting the pressure plate peripheral margin meanwhile the pressure plate is pressing the clutch disc against the second flywheel. Rotation of the ring gear through the backlash angle relative to the first flywheel by the engine-starting cranking torque causes radial advancing of the adjusting mechanism which effects axial movement of the second flywheel toward the clutch disc.

10 Claims, 5 Drawing Sheets

CLUTCH WEAR-COMPENSATING COMPOUND FLYWHEEL ASSEMBLY

This is a divisional application of the U.S. patent application Ser. No. 08/096,046 filed Jul. 22, 1993 and entitled "CLUTCH WEAR-COMPENSATING COMPOUND FLYWHEEL ASSEMBLY" now U.S. Pat. No. 5,349,882 issued on Sep. 27, 1994.

BACKGROUND OF THE INVENTION

The present invention relates generally to internal combustion engine flywheel assemblies, and more particularly, to a clutch wear-compensating compound flywheel assembly self-adjusting to compensate wear on a power-train engaging clutch disc in installation in a motor vehicle.

The flywheel is provided at the head of the vehicle power train so as to smooth fluctuations in engine torque. The torquing power of the engine transmitted to the flywheel is in turn transmitted to the transmission of the power train through engagement of a clutch assembly clutch disc with the flywheel.

A friction facing against which the clutch disc is pressed is machined on the flywheel, to which a clutch cover assembly for pressing the clutch disc against the friction facing is peripherally mounted. The clutch cover assembly mainly comprises the clutch cover mounted onto the flywheel, a pressure plate for clamping the clutch disc between itself and the flywheel, and a diaphragm spring for pressing the pressure plate toward the flywheel, sandwiching the clutch disc therebetween.

In clutch cover assemblies thus constructed, set load characteristics of the diaphragm spring will vary with the degree of deflection (relative to the height at which the diaphragm spring is retained in clutch engagement). As the clutch disc wears, therefore, the deflection varies, such that the diaphragm spring urging force pressing the clutch disc against the flywheel varies. Consequently, this can lead to operational deficiencies. For example, clutch pedal resistance may increase, or clutch slippage may occur.

Therefore, a mechanism has been proposed (in Japanese Patent Application Laid-Open No. 27092/1988) for adjusting according to clutch disc wear the height at which the diaphragm spring is retained in the clutch cover assembly in order to maintain constant pressure on the clutch disc in engagement. Such an adjusting mechanism, provided lateral of the clutch cover assembly, has disadvantages in that it conventionally is structurally very complex, or it does not operate accurately enough to be practicable.

SUMMARY OF THE INVENTION

An object of the present invention is to enable an internal combustion engine compound flywheel assembly to automatically compensate wear on the power-train connecting clutch disc, thereby maintaining constant set load on the diaphragm spring wherein it presses the clutch disc to the flywheel end facing during clutch engagement.

A flywheel assembly according to the present invention is for transmitting Internal combustion vehicle engine power to a clutch disc pressed to a flywheel assembly end friction facing by a pressure plate within a clutch cover, and comprises a first flywheel peripherally carrying a ring gear, a second flywheel, a clutch wear-gauging mechanism, and an adjusting mechanism. The compound flywheel assembly is cranked via the ring gear by a starting motor in starting the engine.

The first flywheel is fastenable to the engine. The ring gear transmits cranking torque from the starting motor to the first flywheel, and is connected to the first flywheel so as to be rotatable through a predetermined angle relative to the first flywheel. The second flywheel is connected to the first flywheel so as to be angularly fixed yet axially movable relative to the first flywheel, and the end thereof opposite the clutch disc is machined as the friction facing against which the clutch disc is pressed. The clutch wear-gauging mechanism gauges clutch disc wear and is provided peripherally in an end surface of the first flywheel opposite the peripheral margin of the pressure plate sandwiching the clutch disc. The adjusting mechanism, in cooperative response to the clutch wear-gauging mechanism, induces the second flywheel to move axially toward the clutch disc utilizing the cranking torque as transmitted by the ring gear.

In this flywheel assembly, the compound flywheel is divided into a first flywheel fixed to the engine and a second flywheel connected to the first flywheel so as to be movable in the axial direction. Wear on the clutch disc as pressed against the second flywheel is gauged by the clutch wear-gauging mechanism. Clutch disc operational wear thus being gauged by the wear gauging mechanism, rotation of the ring gear through the predetermined angle relative to the first flywheel by the engine-starting cranking torque effects radial advancing of the adjusting mechanism, which, by means of inter-flywheel wedging members thereof, effects axial movement of the second flywheel away from the first flywheel, i.e., toward the clutch disc.

Consequently, as the thickness of the clutch disc decreases as it wears, the second flywheel is moved axially toward the clutch disc, compensating the wear. Therefore, the set load on the diaphragm spring pressing the clutch disc in clutch engagement is maintained constant despite clutch disc wear, prolonging clutch disc life and eliminating special maintenance and adjustment requirements.

The foregoing and other objects, aspects and advantages of the present invention will become more apparent from the following detailed description.

DESCRIPTION OF THE PREFERRED EMBODIMENTS

Figure 1:
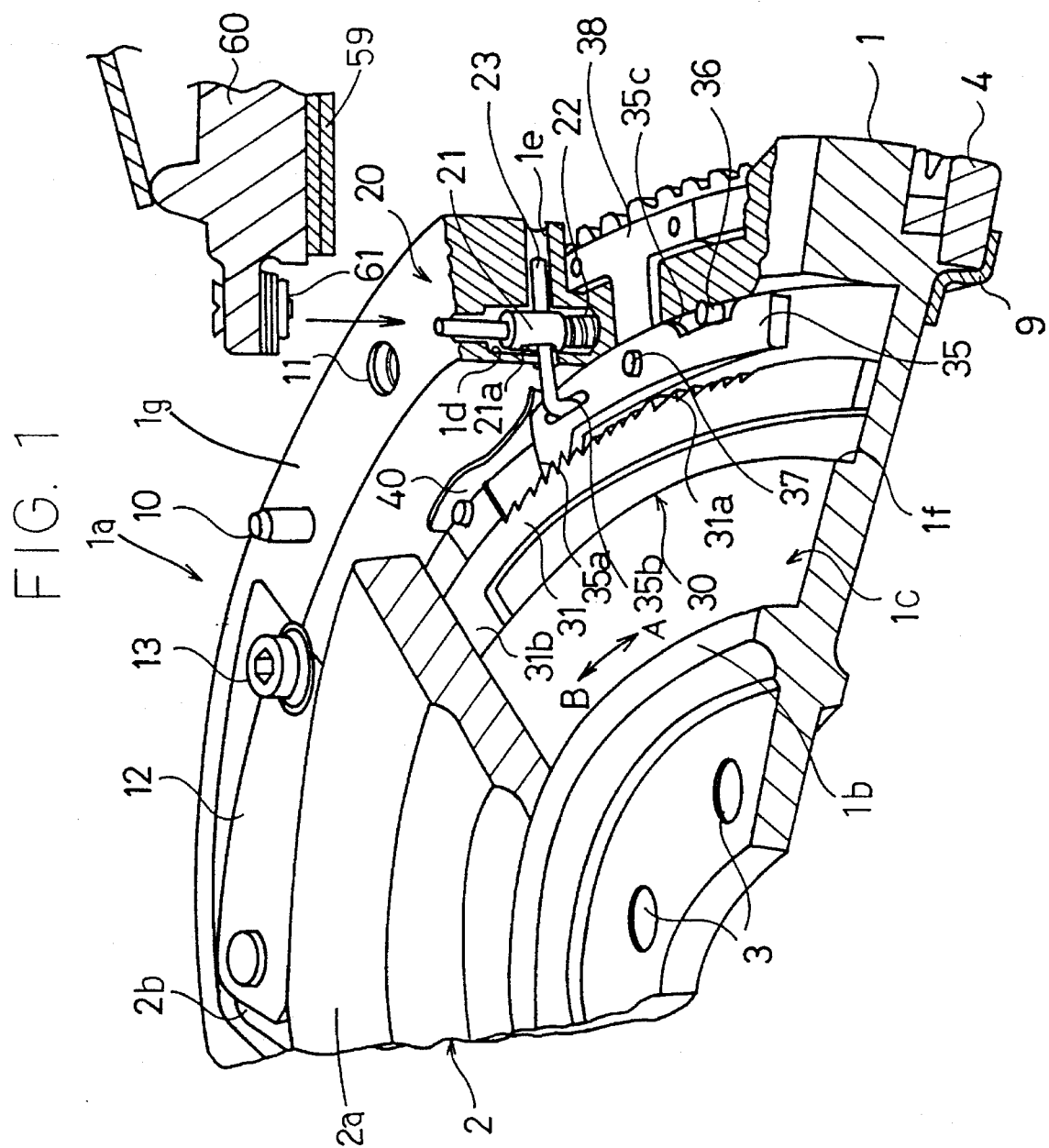
FIG. 1 is a cutaway partial perspective view of a flywheel assembly, together with a sectional view of an associated part of a clutch cover assembly, according to one embodiment of the present invention.

According to one embodiment of the present invention, as shown in FIG. 1, the flywheel assembly comprises a first flywheel 1 and a second flywheel 2. The first flywheel 1, disc-shaped, is fixed to the end of an engine crankshaft by bolts which are inserted through a circumferential plurality of central holes 3 in the flywheel. In addition, the first flywheel 1 peripherally carries a ring gear 4, mounted such that it is permitted a certain amount of rotational play.

Figure 2:
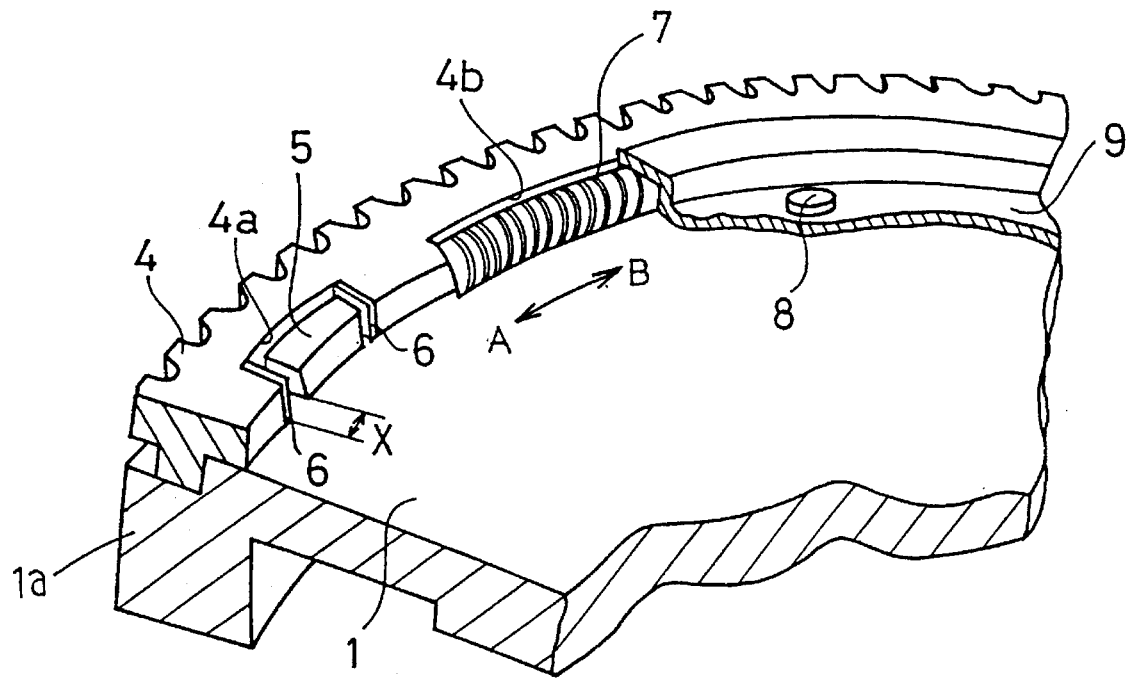
FIG. 2 is a cutaway partial perspective of the rear of the flywheel assembly as shown in FIG. 1.

Radially inward along the ring gear 4 is a circumferentially spaced plurality of drive notches 4a and spring-containing recesses 4b, as shown in FIG. 2, which is a rear view of FIG. 1. Drive projections 5 are provided on the radially peripheral margin of the rear face of the first flywheel 1, and each is fitted in a corresponding driving notch 4a of the ring gear 4. Cushion inserts 6 of, for example, rubber are fixed to the circumferentially opposed end faces of the driving notch 4a to provide soundproof cushioning. A predetermined circumferential clearance X (approximately 4 mm in the present embodiment) is provided between adjacent ends of the driving notch 4a and the driving projection 5. A ring gear return spring 7 for urging the ring gear 4 against the first flywheel 1 in a predetermined direction of rotation is contained In each spring containing recess 4b. One end of the ring gear return spring 7 abuts against a circumferential end face of the spring containing recess 4b and the other end is engaged with the rear face of the first flywheel 1. The ring gear return spring 7 is kept in the recess 4b by a retaining plate 9 fixed to the rear face of the first flywheel 1 by rivets 8. The starting motor pinion (not shown) is engagable with the ring gear 4. When the ring gear 4 is rotated In the direction AB indicated by the arrow in the figures by the starting motor pinion, the first flywheel 1 is rotated subsequent to the ring gear 4 being rotated through an angle of circumferential play corresponding to the clearance between the driving notch 4a and the driving projection 5. In addition, wherein the ring gear 4 is not in cranking engagement with the starting motor, the ring gear 4 is urged in the direction A of the arrow in FIG. 2 by the ring gear return spring 7, whereby the predetermined clearance X is maintained between the end face of the driving notch 4a and the driving projection 5.

Returning to FIG. 1, a cylindrical extension 1a of the first flywheel 1 is shown projecting toward a clutch disc 59. A facet 1b extending toward the clutch disc 59 is formed in the middle of the first flywheel 1, providing an annular recess 1c between the facet 1b and the cylindrical extension 1a. A pair of knock pins 10 (only one is Illustrated in FIG. 1) is provided, and a clutch cover mounting tapped hole 11 is formed on an end face of the cylindrical extension 1a.

The second flywheel 2 is an annular plate, and is contained in the recess 1c in the first flywheel 1. The second flywheel 2 has a friction facing 2a with which the clutch disc 59 is brought into contact by pressure. The radially inner rim of the second flywheel 2 is carried on the facet 1b of the first flywheel 1, from which it is axially movable. In addition, fixing tabs 2b extending radially outward are formed at predetermined circumferential spacing on the periphery of the second flywheel 2. One end of a strap plate 12 is fixed to each fixing tab 2b and the other end thereof is fixed to the peripheral margin of the first flywheel 1 by bolts 13. Thus assembled, the second flywheel 2 is not rotatable relative to the first flywheel 1, yet is movable in the axial direction thereof.

A wear gauging mechanism 20 for gauging clutch disc wear is provided in the cylindrical extension 1a of the first flywheel 1. The wear gauging mechanism 20 has a wear gauging rod 21. The wear gauging rod 21 is contained so as to be movable in the axial direction in an axial hole 1d which is formed in the cylindrical extension 1a of the first flywheel 1. A spring 22 for urging the wear gauging rod 21 toward an end face 1g of the first flywheel 1 is contained in the side of the first flywheel 1 to the rear of the wear gauging rod 21. A tip end of the wear gauging rod 21 projects by a predetermined amount beyond the face 1g, urged by the spring 22. The head of a strap plate fixing rivet 61 fixed to the peripheral margin of a pressure plate 60 can abut against the tip of the wear gauging rod 21. An oblong hole 21a having a predetermined axial length is formed in the wear gauging rod 21, and a linker arm 23 is inserted through the oblong hole 21a. The linker arm 23 is an L-shaped rod inserted in a through-hole 1e radially perforating the cylindrical extension 1a of the first flywheel 1. A bent portion in an end of the linker arm 23 is exposed to the recess 1c in the first flywheel 1.

An adjusting mechanism 30 for inducing the second flywheel 2 to move axially toward the clutch disc 59 in cooperative response to the wear gauging mechanism 20 is disposed between the first flywheel 1 and the second flywheel 2 in the recess 1c.

Figure 3:
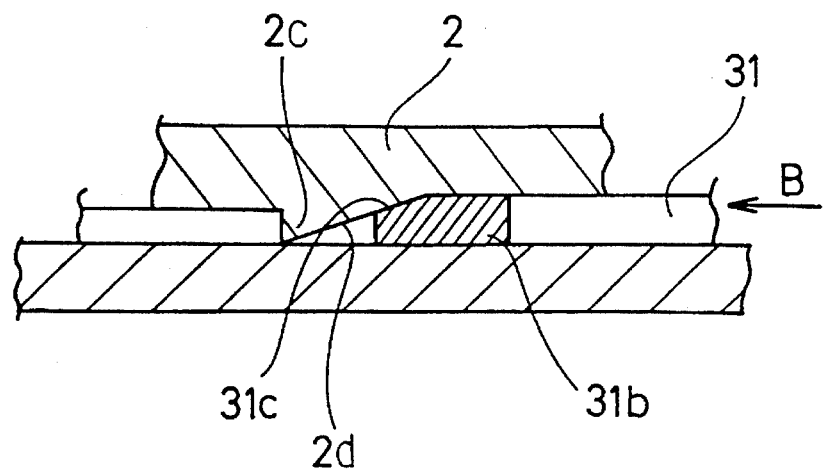
FIG. 3 is a sectional partial view of the flywheel assembly as shown in FIG. 1.
Figure 4:
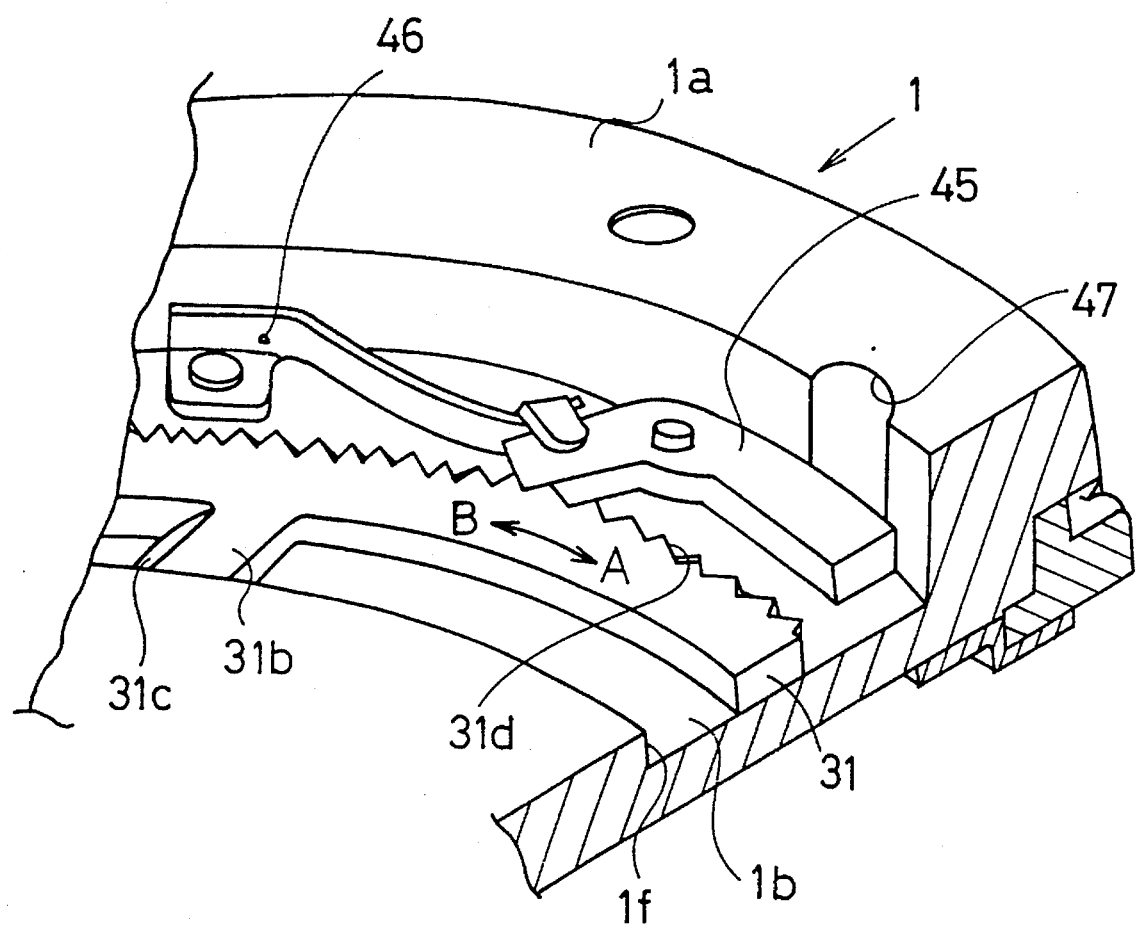
FIG. 4 is a cutaway partial perspective view of a locking mechanism on an annulus ratchet.

The adjusting mechanism 30 includes a sectorally toothed annulus 31 disposed in the radially outer portion of the recess 1b. One toothed sector of the annulus 31 is a ratchet 31a formed over a predetermined angle thereof in a portion opposite the wear gauging mechanism 20. In addition, six circumferentially equidistant wedging members 31b are formed extending radially inward of the annulus 31. The circumferentially end margin of each wedging member 31b is a wedge surface 31c, as shown in FIGS. 3 and 4. In addition, a radially inner end of the wedging member 31b is supported on a stepped portion 1f of the recess 1b, on which the annulus 31 is thus circumferentially movable. Likewise, wedge projections 2c are formed in portions on the rear surface of the second flywheel 2 corresponding to the wedging members 31b of the annulus 31. Each wedge projection 2c has an inclined surface 2d abutting against the wedge surface 31c of the wedging member 31b, with which it has common slope.

As shown in FIG. 1, an engager lever 35 is disposed opposite the ratchet 31a of the annulus 31 in a portion of the recess 1c in the first flywheel 1. The engager lever 35 is arced and has a circumferential pawl portion 35a along its inner rim, engaging with the ratchet 31a. In addition, a circumferentially oblong hole 35b is formed in the end of the engager lever 35 near the pawl portion 35a, and the bent portion in the end of the linker arm 23 of the wear amount detecting member 20 is inserted in the oblong hole 35b. A notch 35c is formed in the opposite end in the radially outer rim of the engager lever 35. A pin 36 fixed to the recess 1c in the first flywheel 1 is received in the notch 35c.

The center of the engager lever 35 is pivotally supported on a pin 37 on the radially inward end of a T-shaped torque-transmitting member 38. The torque-transmitting member 38 is fixed to the ring gear 4. The center of gravity of the engager lever 35 is thus supported such that the pawl portion 35a is pivoted outward around the pin 37 under centrifugal force of the flywheel assembly.

Furthermore, a plate spring 40 is fixed to the recess 1c in the first flywheel 1. The free end of the plate spring 40 urges the engager lever 35 radially inward on the pawl portion 35a end thereof.

In a certain position of the radially outer rim of the annulus 31, a ratchet 31d is formed over a predetermined sectoral angle range, as shown in FIG. 4. One end of a locking claw 45 engages with the ratchet 31d. The locking claw 45 is pivotally mounted In the recess 1b, and the engaging end thereof is urged toward the ratchet 31d by a plate spring 46. The locking claw 45 allows rotation of the annulus 31 in the direction indicated by arrow B of FIG. 4, and inhibits rotation thereof in the opposite direction (in the direction indicated by arrow A). A screwdriver insertion slot 47 for releasing the locking of the locking claw 45 is formed to open on the face 1g of the first flywheel 1.

Figure 5:
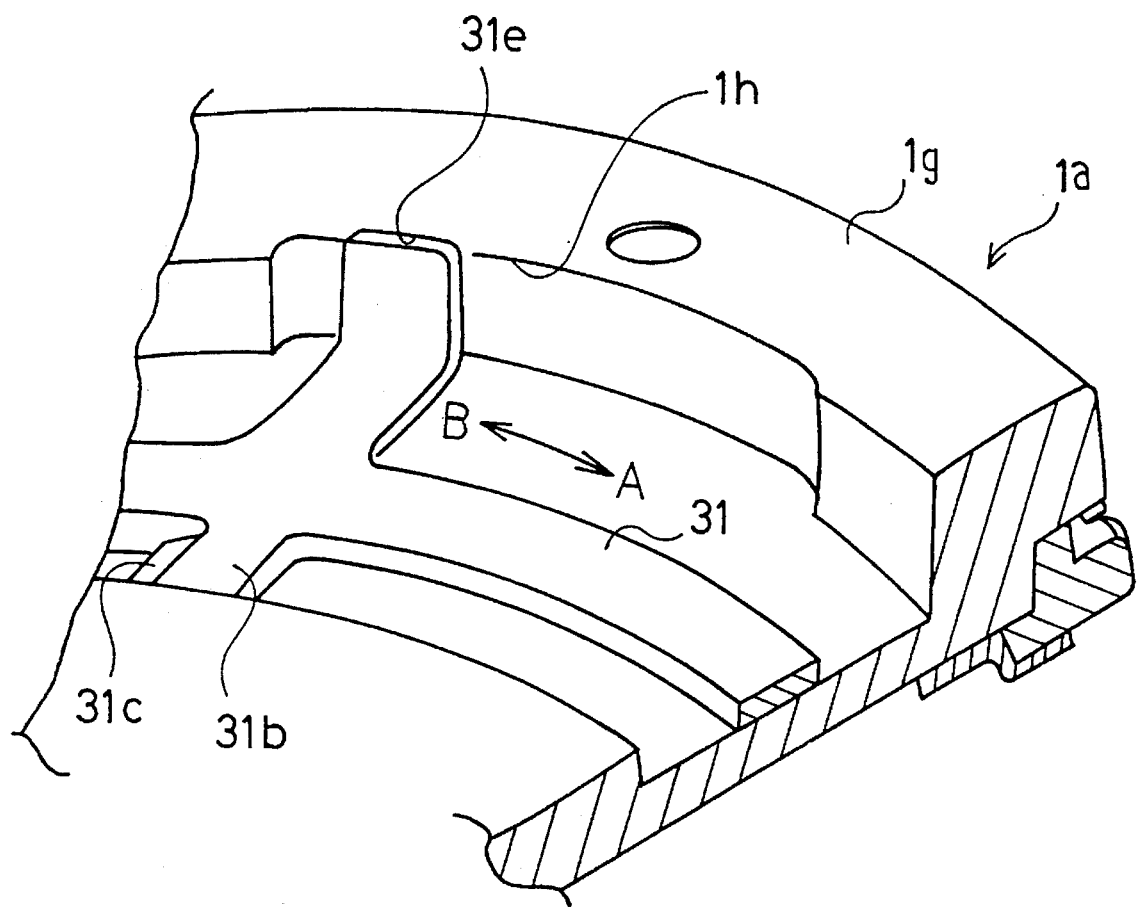
FIG. 5 is a cutaway partial perspective view of a reset mechanism on the annulus.

Furthermore, a reset tab 31e projecting radially outward and, further, bent toward the clutch disc, is formed extending from the radially outer rim of the annulus 31, as shown in FIG. 5. The reset tab 31e projects by a predetermined amount outward from the face 1g of the first flywheel 1 through a notch 1h formed lateral of the cylindrical extension 1a.

Description is now made of the operation of the flywheel assembly.

Wherein the clutch disc 59 is fresh, the head of the rivet 61 of the pressure plate 60 does not come into contact with the wear gauging rod 21. In that state, the wear gauging rod 21 is fully projected toward the clutch disc 59 by the spring 22. Therein, the linker arm 23 is caught against respective adjacent surfaces of the through hole 1e and the oblong hole 21a of the wear gauging rod 21 such that it is radially immobilized. Initially then, the pawl portion 35a of the engager lever 35 is pivoted radially outward against the urging force of the plate spring 40, wherein the pawl portion 35a of the engager lever 35 is not engaged with the ratchet 31a of the annulus 31.

When the staring motor is activated so as to crank the engine in this state of the flywheel assembly, the ring gear 4 is rotated in the direction indicated by arrow B by the starting motor pinion, and the cranking torque received by the ring gear 4 is transmitted to the first flywheel 1 through the driving projections 5, via the cushioning inserts 6, cranking the engine through the flywheel assembly in the direction indicated by arrow B. At this time, there is a backlash of approximately 4 mm between the ring gear 4 and the first flywheel 1 in the direction B of rotation. Since the ring gear 4 and the first flywheel 1 abut against each other through the cushioning inserts 6, however, no rattle or the like arises, and the impact force exerted on the driving projection 5 is alleviated.

Wherein the clutch disc has undergone operational wear, the head of the flyer 61 of the pressure plate 60 comes into pressing contact against the wear detecting rod 21. Consequently, the wear detecting rod 21 is moved toward the engine against the spring force of the spring 22, freeing the linker arm 23 to slide radially. Thus, the end of the engager lever 35 on which the plate spring 40 rides gets pushed radially inward thereby, pivoting the pawl portion 35a counterclockwise in FIG. 1 around the pin 37. The pawl portion 35a is consequently engaged with the ratchet 31a of the annulus 31.

Wherein the starting motor is activated to crank the engine in this state of the assembly, the ring gear 4 is rotated in the direction of arrow B. Due to the approximately 4 mm backlash between the ring gear 4 and the first flywheel 1, initially only the ring gear 4 rotates through a thus predetermined angle in the direction B, whereupon rotation of the first flywheel 1 follows. The rotation of the ring gear 4 is transmitted to the engager lever 35 through the torque-transmitting member 38, rotating the engager lever 35 through a corresponding predetermined angle in the direction of arrow B shown in FIGS. 1 and 3. In turn, the pawl portion 35a of the engager lever 35 in engagement with the ratchet 31a of the annulus 31, rotates the annulus 31 in the direction relative to the first flywheel 1. Consequently, the wedge surface 31c of the wedging member 31b twists against the inclined surface 2d of the second flywheel 2, whereby the second flywheel 2 is driven axially toward the clutch disc 59.

Wherein the engager lever 35 has been rotated through a certain angle, a following end face of the notch 35c abuts against the pin 36. Consequently, the engager lever 35 is pivoted clockwise in FIG. 1 around the pin 37. Therefore, the pawl portion 35a of the engager lever 35 comes off the ratchet 31a of the annulus 31. Meanwhile, the second flywheel 2 has been driven out toward the clutch disc 59, such that the head of the rivet 61 of the pressure plate 60 is now again spaced apart from the tip of the wear gauging rod 21 of the wear gauging mechanism 20, wherein the linker arm 23 is caught, radially immobilized. Consequently, the engager lever 35 cannot be pivoted counterclockwise in FIG. 1 to engage with the ratchet 31a again.

The wear of the clutch disc is thus gauged by the wear amount gauging mechanism 20 via the wear detecting rod 21, and the adjusting mechanism 30 by means of the annulus 31 accordingly drives the second flywheel 2 out toward the clutch disc 59. Therefore, the clutch-engaged position of the pressure plate 60 relative to the diaphragm spring is restored corresponding to the clutch disc wear; thus the initial-set load on the diaphragm spring is always maintained.

When a worn clutch disc is to be replaced with a fresh one, each of the wear-compensating mechanisms must be set to the initial state. In that instance, a screwdriver is inserted into the hole 47 shown in FIG. 4, to push the adjacent end of the locking claw 45 radially inward. This frees the annulus 31 to be rotated. In this state, the reset claw 31e shown in FIG. 5 is swung via the tab 31e in the direction indicated by arrow A. Thus, the annulus 31 previously advanced in the course of clutch wear compensation is returned to the initial position.

In the present embodiment, despite the clutch disc 59 wear, the diaphragm spring pressing load is maintained constant by the adjustment of the axial position of the second flywheel 2 corresponding to the clutch disc 59 wear meanwhile the engine is started. Therefore, permissible wear of the clutch disc is increased, lengthening the operational life of the clutch disc 59. Furthermore, clutch pedal resistance is maintained constant over a long period. Moreover, maintenance adjustments to other respective components of the flywheel/clutch assemblies in response to wear of the clutch disc 59 are not required.

Further Embodiment

Figure 6:
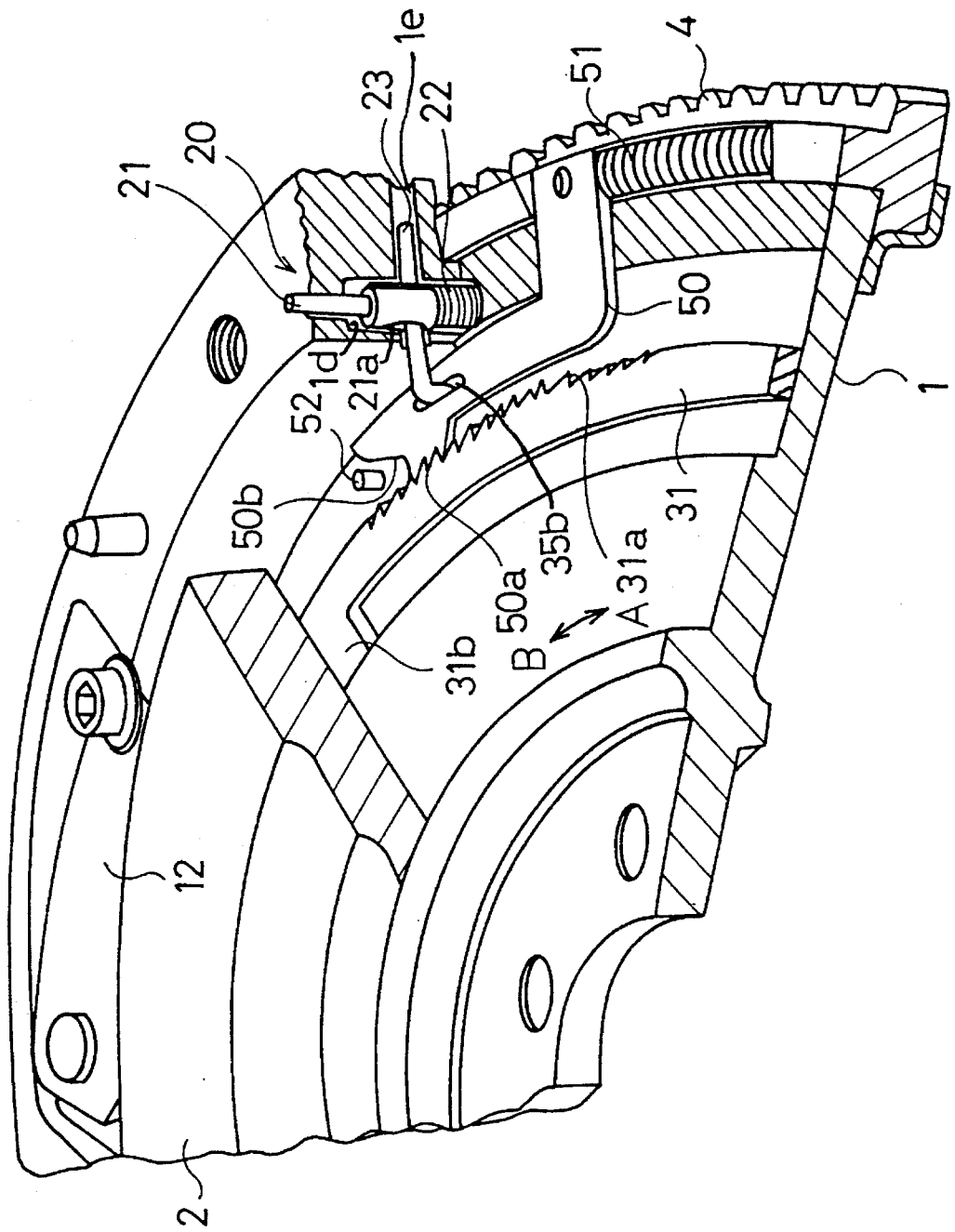
FIG. 6 is a cutaway partial perspective view of another embodiment of the present invention.

In the above-described embodiment, the torque produced by the ring gear 4 is transmitted to the engager lever 35 through the T-shaped torque-transmitting member 38 and the pin 37; alternatively this element may be constructed as shown in FIG. 6.

In the embodiment illustrated In FIG. 6, an arced engager arm 50 is provided, one end of which extends radially outward, engaged at its tip with a member (not shown) inside a ring gear 4 so as to be angularly slidable. Torque received by the ring gear 4 is transmitted to the member fixing the engager arm 50 through a spring 51, angularly sliding the feed claw 50. In addition, a pawl portion 50a is formed along the radially inner portion of the feed claw 50 at the opposite end, which narrows in a tapered portion 50b. In addition, a pin 52 is fixed immediate the tapered portion 50b. Remaining construction therein is the same as that in the above-described embodiment.

In the present embodiment, wherein the locking of linker arm 23 is released, the end of the feed claw 50 is allowed to rotate counterclockwise in FIG. 6 under the urging force of the spring 51, whereby the pawl portion 50a engages with the ratchet 31a on annulus 31. Clutch wear-compensating adjustment is effected therein, likewise as In the above described embodiment. When the annulus 31 is rotated in the direction indicated by arrow B in FIG. 6 by the adjustment operation, the tapered portion 50b on the end of the engager arm 50 abuts against the pin 52. Consequently, the end of the engager arm 50 is rotated clockwise in FIG. 6, whereby the pawl portion 50a comes off the ratchet 31a.

In this embodiment, structure for working the engager arm 50 is simplified. In addition, the torque on the engager arm 50 is received through the spring 51, such that load exerted on the pawl and ratchet engaging teeth is less than the spring load during engine start, thereby preventing damage to the engaging teeth.

Various details of the invention may be changed without departing from its spirit nor its scope. Furthermore, the foregoing description of the embodiment according to the present invention is provided for the purpose of illustration only, and not for the purpose of limiting the invention as defined by the appended claims and their equivalents.

What is claimed is:

1. A clutch wear-compensating compound flywheel assembly, comprising:

a first flywheel;

a ring gear peripherally connected to said first flywheel so as to rotate through a predetermined angle relative to said first flywheel;

a second flywheel connected to said first flywheel for unitary rotation and limited axial displacement relative to said first flywheel and bearing a friction facing against which a clutch disc is pressed;

a clutch wear-gauging mechanism provided in an end surface of said first flywheel facing said clutch disc, for gauging wear of said clutch disc;

an adjusting mechanism for inducing said second flywheel to move axially toward said clutch disc utilizing a cranking torque as transmitted by said ring gear, in cooperative response to said clutch wear-gauging mechanism, said adjusting mechanism including:

wedging members contacting to drive said second flywheel toward said clutch disc;

an engager arm in linkage with said clutch wear-gauging mechanism, one end of said engager arm being pivotally coupled to said ring gear and the other end of said engager arm selectively engaging one of said wedging members for wedging one of said wedging members against the other utilizing said cranking torque transmitted by said ring gear to move said second flywheel axially toward said clutch disc.

2. A clutch wear-compensating compound flywheel assembly according to claim 1, wherein said adjusting mechanism further including:

an urging mechanism for urging said engager arm in a direction engaging said engager arm with one of said wedging members;

said engager arm being selectively restrained in movement with respect to one of said wedging members in response to movement of said clutch wear-gauging mechanism.

3. A clutch wear-compensating compound flywheel assembly according to claim 1 wherein said clutch wear-gauging mechanism comprises:

a gauging member projecting from said first flywheel;

a first spring (22) for urging said gauging member from said first flywheel; and a linker arm, disposed radially through said end surface of said first flywheel and normally locked therein by said wear-gauging mechanism; said linker arm radially sliding in response to movement of said gauging member by an amount predetermined corresponding to clutch disc operational wear.

4. A clutch wear-compensating compound flywheel assembly according to claim 3, wherein:

said wedging members of said adjusting mechanism having circumferentially extending, complementarily inclined surfaces slidably contacting in wedging abutment, and said wedging members being an annulus peripherally carrying an engaging teeth;

said engaging mechanism being formed to have a portion for connection with said linker arm; and said urging mechanism including a pin to meet with a tapered portion of said engager arm whereby said engager arm engages with said engaging teeth of said wedging members.

5. A clutch wear-compensating compound flywheel assembly according to claim 3, wherein a cylindrical extension projecting from said first flywheel toward said clutch disc for receivably containing said second flywheel, said clutch-gear gauging mechanism being retained within said cylindrical extension, and said adjusting mechanism being disposed radially inward of said cylindrical extension.

6. A clutch wear-compensating compound flywheel assembly according to claim 5, wherein:

said cylindrical extension being formed with intersecting axial and radial holes (1d, 1e);

said gauging member is a first rod (21) disposed in the axial hole so as to be axially movable, and such that one end thereof projects from said axial hole in an end face of said cylindrical extension, for abutting from said cylindrical extension; said first rod being radially penetrated by an axially extending oblong hole;

said linker arm is a second rod (23) disposed in the radial hole through said first flywheel cylindrical extension, passing through said oblong hole of said first rod, and projecting in a bent end radially inward from a radially inner surface of said cylindrical extension, which bent end connects into said portion of said engaging mechanism; and said first spring axially urges said first rod such that said second rod as retained in said oblong hole is pressed against a bore surface of said radial hole of said first flywheel cylindrical extension said clutch disc being fresh, whereby said second rod is immobilized radially of said first flywheel.

7. A clutch wear-compensating compound flywheel assembly according to claim 1, further comprising:

a ratchet locking mechanism allowing said wedging members to advance rotated relative to said first flywheel when said wedging members are driven via engagement of said engaging mechanism to follow said cranking torque as transmitted by said ring gear, said ratchet locking mechanism retaining said wedging members thus advanced, and inhibiting said wedging members from being rotated in a direction opposed to said cranking torque.

8. A clutch wear-compensating compound flywheel assembly according to claim 7, further comprising a ratchet lock-releasing mechanism for releasing and resetting said ratchet locking mechanism from said wedging members.

9. A clutch wear-compensating compound flywheel assembly according to claim 1, wherein said adjusting mechanism further comprises a second spring (51) for transmitting said cranking torque from said ring gear to said engager arm.

10. A clutch wear-compensating compound flywheel assembly according to claim 1, wherein said ring gear and said first flywheel have respective abutting portions abutting against each other wherein said ring gear receives said cranking torque from a starting motor.

* * * * *